Figure 1:
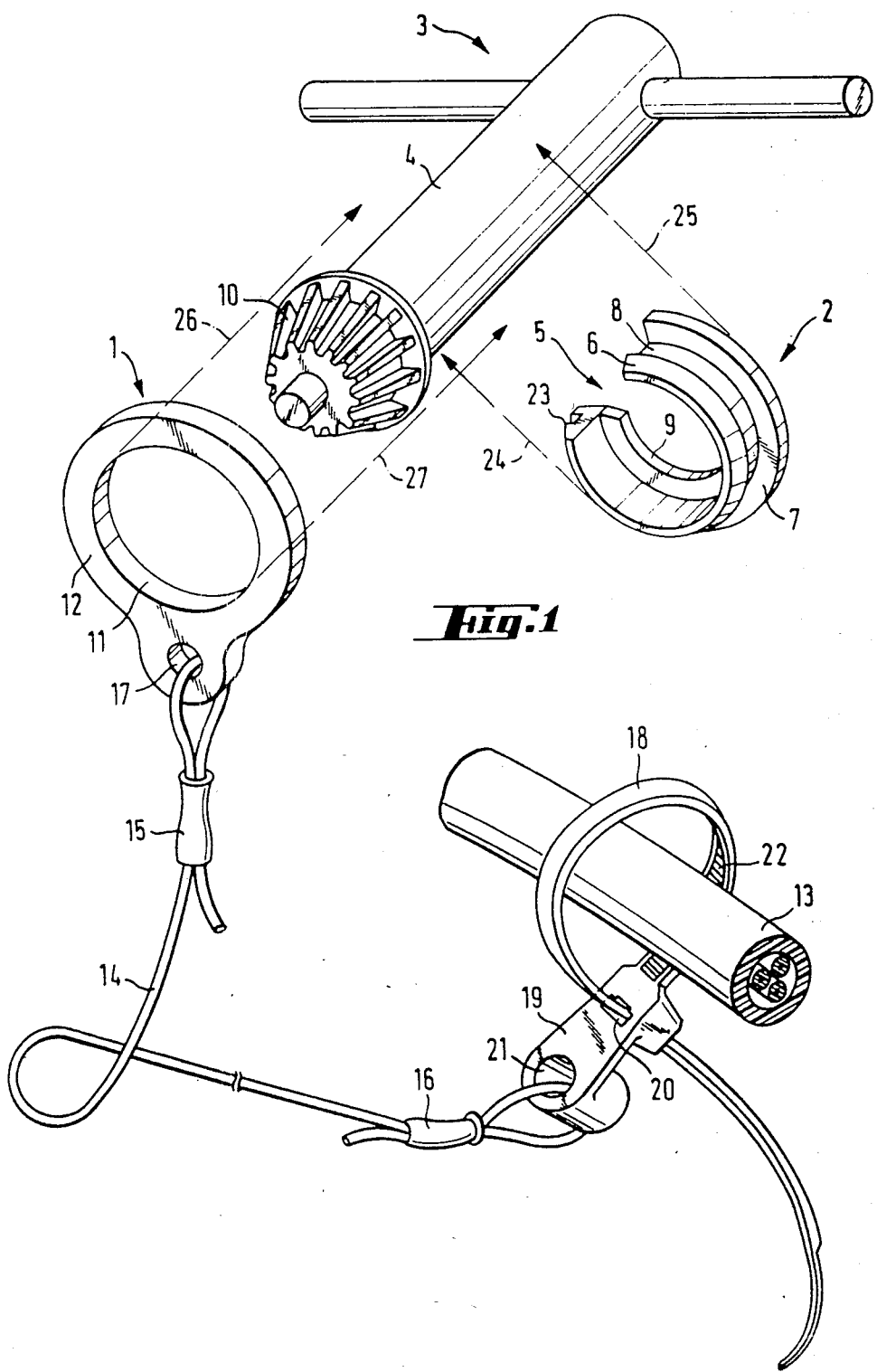

United States Patent [19]

Olsen

[11] Patent Number: 4,558,495
[45] Date of Patent: Dec. 17, 1985

[54] HOLDER, ESPECIALLY FOR A DRILL CHUCK KEY

[76] Inventor: Torbjörn Olsen, P O B 5172, S-533 00 Götene, Sweden

[21] Appl. No.: 497,276

[22] Filed: May 23, 1983

[30] Foreign Application Priority Data

Jun. 18, 1982 [DE] Fed. Rep. of Germany ....... 3222762

[51] Int. Cl.⁴ ............................................. B23B 45/00
[52] U.S. Cl. .................................. 24/298; 24/16 PB; 24/335; 248/52; 279/1 K; 408/241 R
[58] Field of Search ........................ 279/1 K; 81/90 A; 408/241 R; 16/2, 108, 109; 248/74.5, 52; 24/16 R, 16 PB, 17 R, 17 A, 17 B, 17 AP, 20 R, 20 EE, 27, 30.5 R, 30.5 PB, 150 FP, 301, 484, 298–300, 302, 305, 335; 403/326, DIG. 7

[56] References Cited

U.S. PATENT DOCUMENTS

| 1,615,586 | 1/1927 | Kleffman | 24/30.5 R |
| 1,980,661 | 11/1934 | Bradley | 24/27 |
| 2,225,472 | 12/1940 | Franklin | 16/2 X |
| 2,648,879 | 8/1953 | Patterson | 24/16 PB |
| 2,880,008 | 3/1959 | Stoner | 279/1 K |
| 2,948,773 | 8/1960 | Hawes | 16/2 |
| 2,970,729 | 2/1961 | Allen | 24/17 AP X |
| 3,365,753 | 1/1968 | Prenner et al. | 24/16 PB |
| 3,438,095 | 4/1969 | Evans | 24/16 PB |
| 3,780,401 | 12/1973 | Reiner | 24/16 PB |
| 4,111,079 | 9/1978 | Derbyshire | 279/1 K X |
| 4,268,947 | 5/1981 | Hile | 16/2 X |

FOREIGN PATENT DOCUMENTS 1119144  3/1982  Canada ............................... 279/1 K Primary Examiner—William E. Lyddane
Assistant Examiner—James R. Brittain
Attorney, Agent, or Firm—Browdy and Neimark

[57] ABSTRACT

Holder especially for a chuck key for a drilling or other machine tool, for which it is necessary to use a chuck key for opening and closing the chuck holding the working tools. The chuck key is attachable to the power cord of such a machine tool in such a way that it remains rotatable although not removable from the machine tool. To achieve this there is provided a locking device (2) mounted on the shaft of the chuck key, which locking device is inserted in a mounting device, which is attached to the power cord.

9 Claims, 5 Drawing Figures

HOLDER, ESPECIALLY FOR A DRILL CHUCK KEY

The present invention relates to a holder for a chuck key or the like for a machine tool, especially a drilling machine, for flexible connection to the machine, preferably to its power supply line.

A chuck key is commonly used with drilling machines, hammer drills, milling machines, grinding and polishing tools and the like to open and close the chuck. Due to frequent changes of tools in such machines the chuck key will be used correspondingly frequently and must always be near at hand, otherwise valuable operation time will be lost in finding and picking up the chuck key.

It is previously known, to attach the chuck key to the machine itself. It must then be removed from the machine when used, and after removing or inserting a tool in the machine it must be fastened to the machine again.

It is an object of the present invention to provide a holder for a chuck key, especially for a drilling machine, which has a practical and simple construction, is easy to handle and safe to use.

The invention presents the advantages compared to the prior art that the chuck key in a simple and dependable way is attachable to the holder and thus to the machine via its power supply line, and while being attached always can be used for the removal and the insertion of a tool in the machine in question, without any need to remove the chuck key from its holder. However, should it be necessary, the chuck key can be removed from the holder, although this is only possible by using both hands, while the chuck key can be operated with one hand, even when it is mounted in the holder and thus is impossible to lose.

The holder according to the invention comprises an outer preferably circular mounting device and a locking device, which is inserted between the mounting device and the shaft of the chuck key.

According to a further development of the invention the locking device has a circular shape and encircles more than half a circle but less than a full circle, and the free width of the opening in the locking device is preferably smaller than the diameter of the shaft of the chuck key. This offers the advantage that even when the holder is removed from the chuck key the locking device will remain on the chuck key, and in this way the key can be quickly reattached to the mounting device.

The locking device is tapered at its insertion end and has a stop flange at its opposite end. This makes it easier to insert the chuck key in the mounting device.

According to a further embodiment of the invention the locking device is encircled by a groove, preferably in the center, for accommodating the mounting device. This feature provides a safe hold for the chuck key in the holder.

The diameter of the opening in the mounting device, which is limited by an inner edge, which inner edge is housed in the circular groove of the locking device, when the mounting device is mounted, is bigger than the diameter of the groove, and the shaft of the chuck key may be mounted with a radial play in the locking device. In this way it is always easy to rotate the chuck key to remove or insert a tool in the machine.

In another embodiment of the invention the diameter of the opening in the mounting device, which opening is limited by an inner edge, which inner edge is situated in the circular groove of the locking device, when the locking device is inserted in the mounting device, is greater than the diameter of the groove, and the shaft of the chuck key is thus effectively fixed in the locking device. Because the locking device is inserted and held in the mounting device with some radial play, it is still possible to rotate the chuck key for changing tools at all times.

In another embodiment of the invention the locking device is fixed in the mounting device, and the shaft of the chuck key is mounted with radial play in the locking device. Also in this way it is possible to rotate the chuck key at any time, although it is mounted to the machine such that it cannot be lost.

According to a further embodiment of the invention the locking device is mounted immovable in the mounting device, and also the shaft of the chuck key is immovable in the locking device. This feature gives the mounting of the chuck key in the holder a greater safety. At the same time it is still possible to rotate the chuck key for changing tools in the machine because the holder is connected to the fastening device at the power supply line by a flexible connection.

According to a preferred embodiment of the invention, the outside diameter of a gearing of the chuck key is bigger than the diameter of its shaft, and when the locking device is mounted, bigger than an overlapping inner edge of the locking device. Also when mounting the chuck key in the holder with a certain radial play the greater diameter of the gearing of the key in relation to the corresponding opening in the holder ensures that it is impossible to lose.

According to one embodiment of the invention the mounting device is joined to a clamp strap by a string. Even if the chuck key is solidly mounted in the holder it is always rotatable because of the flexibility of the string.

Instead of a string a band or a chain can be used between the holder and the clamp strap at the power supply line.

In order to achieve a economical manufacture of the chuck key holder, the mounting device may be made in one piece with the clamp strap.

In order to achieve additional safety in the mounting of the clamp strap, the end of it, which is known per se, may be provided with resilient hooks pointing inwards, which hooks snap in on fastening of the clamp strap and ensure that the clamp strap is not unintentionally opened.

Figure 2:
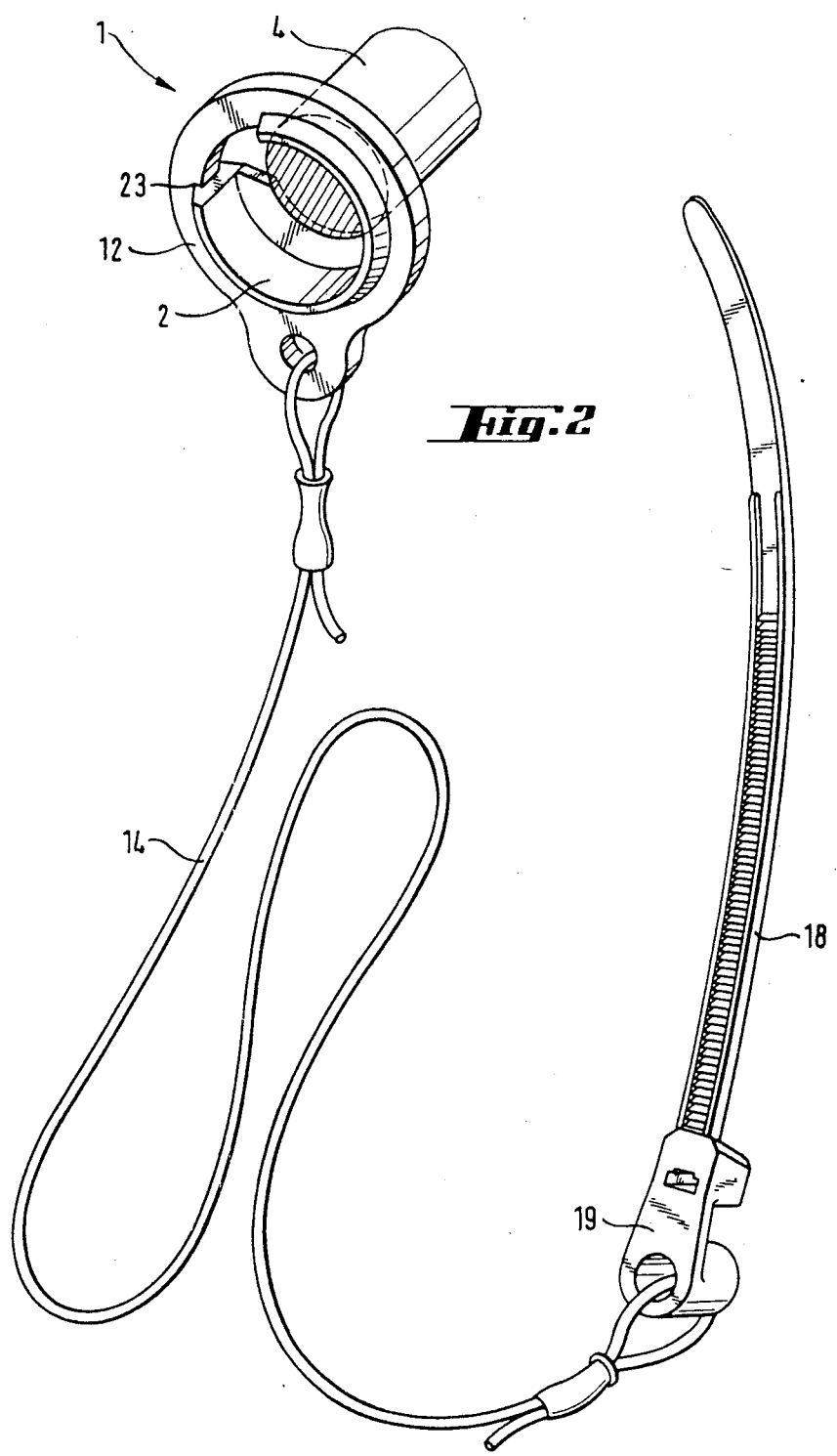
Figure 3:
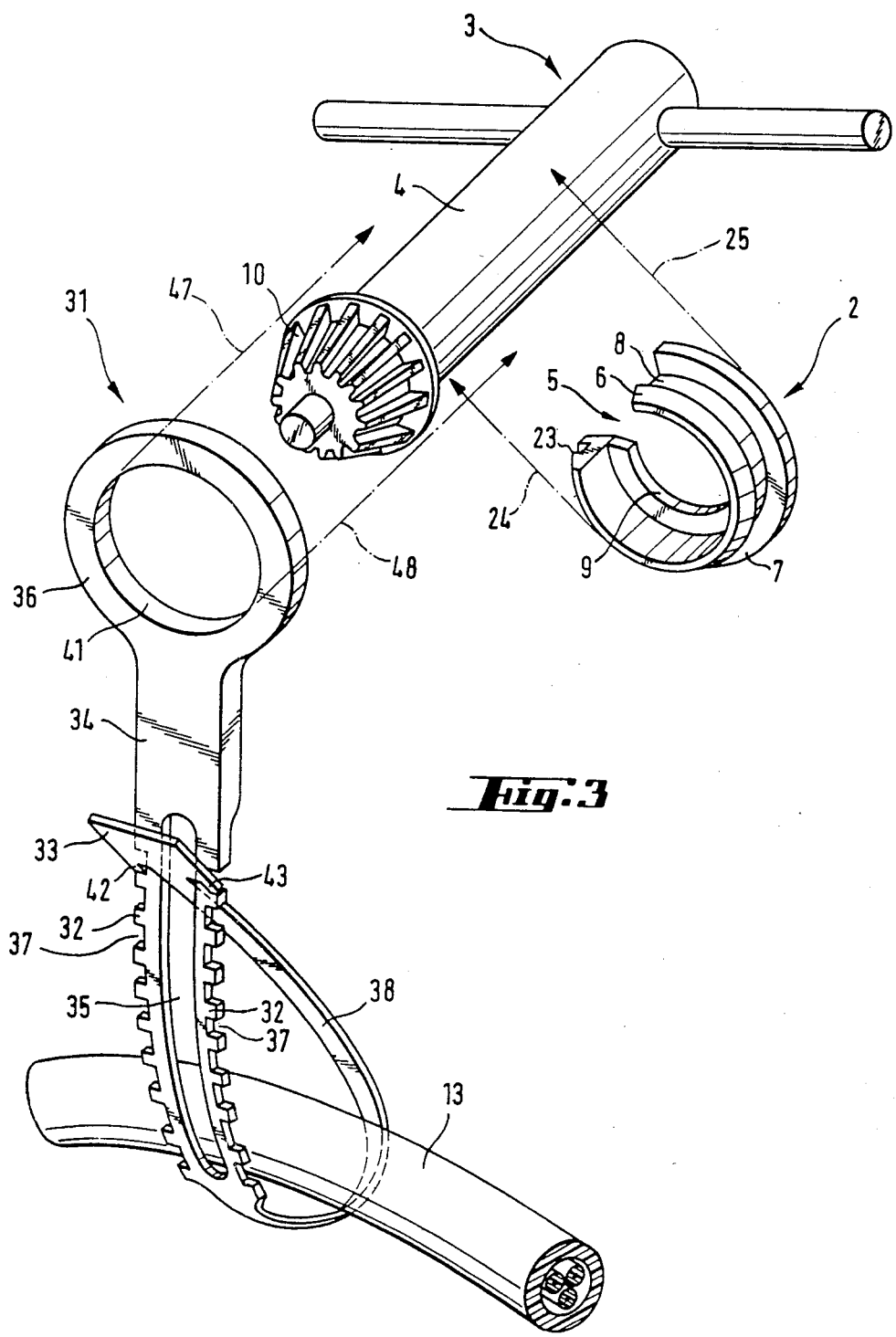
Figure 4:
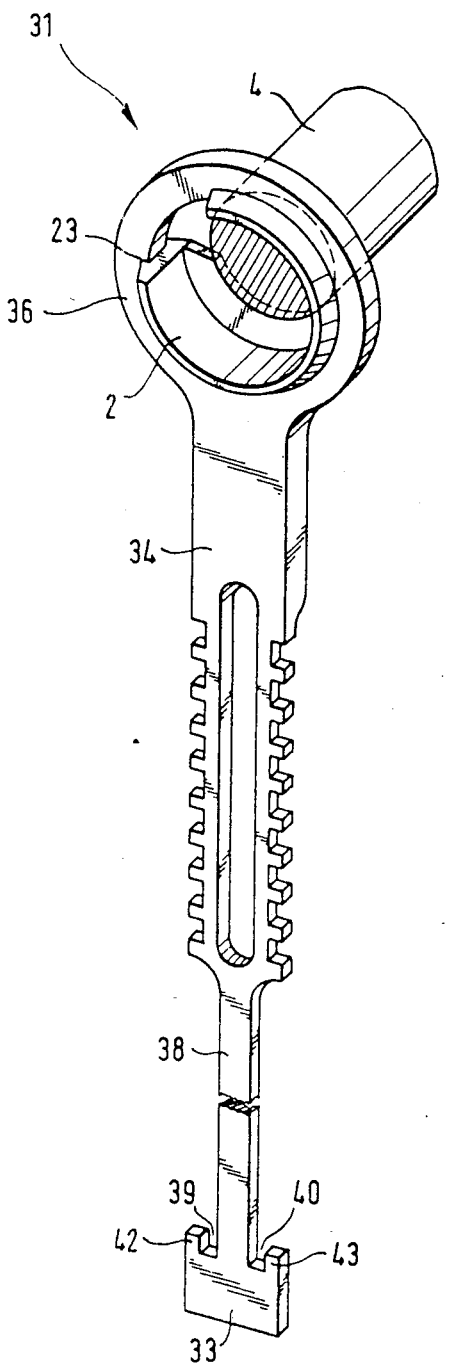
Figure 5:
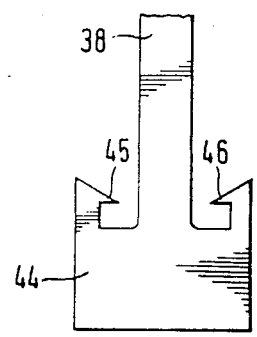

The invention is described in greater detail in the following description by way of preferred embodiments and with reference to the accompanying drawings, in which FIG. 1 is perspective and partly exploded view of a holder according to the invention secured to a power supply line for a machine and a chuck key, FIG. 2 is a perspective view of the holder of FIG. 1, but with the shaft of the chuck key inserted and the clamp strap removed from the power supply line, FIG. 3 is a second embodiment of the invention holder in a perspective and partly exploded view attached to a power supply line together with a chuck key, FIG 4 is the holder of FIG. 3, with mounted chuck key shaft and FIG. 5 is an alternative end of the strap band of FIG. 4 provided with hooks facing each other in order to avoid unintentional unclamping.

A chuck key for a device, for instance a drill, hammer drill, milling-, grinding- or polishing machine should be attached to its power supply line, e.g. an electrical cord or a pressure air house, in such a way that it on the one hand is not easy to remove and on the other hand is always free to rotate in order to remove or insert a tool out of air into the machine in question.

In order to achieve this there is provided a preferably ring-shaped locking device 2, which encircles more than half a circle but less than a full circle. The locking device 2 is provided with a slot 5, the open width of which is preferably less then the diameter of the shaft 4 of the chuck key 3. The locking device 2 is made of a resilient material, and through its slot 5 the shaft 4 of the chuck key 3 may be snapped into the locking device 2.

Furthermore there is provided an outer, preferably ring-shaped mounting device 1, which exhibits an opening, which is limited by an inner edge 11, the width of said inner edge being greater than the outside diameter of the gearing 10 of the chuck key 3. Hence the chuck key 3 together with the mounted locking device 2 may be pushed in the direction of the arrows 26, 27 into the opening of the mounting device 1. Said locking device 2 in the direction of insertion is provided with a tapered insertion end 6 and thus can be easily pushed into the opening of the mounting device 1 and will snap in place. The mounting device 1 after the snapping in will be located in a circular groove 8 of the locking device, which groove is provided with a stop flange 7 at its far end, so that the locking device 2 is held by the mounting device 1. In doing this an edge 23 of the locking device 2 is partly overlapping the mounting device 1, such that a flange surface 12 of the mounting device 1 will be partly covered by the edge 23 of the locking device 2.

The diameter of the inner edge 11 of the mounting device 1 may be bigger than the outside diameter of the bottom of the groove 8 in the locking device 2, such that the latter remains rotatable in relation to the mounting device when coupled together. In the same way the diameter of the shaft 4 of the chuck key 3 and an inner edge 9, with which the locking device 2 is resting on the shaft 4, may be so adapted that the locking device 2 similarly remains easily rotatable on the shaft 4 of the chuck key 3, at the same time as it is easily rotatable on the outside when the mounting device 1 is snapped into position in the locking device. The various diameters of the inner edge 11 and the bottom of the groove 8 on the one side as well as the inner edge 9 and the outside diameter of the shaft 4 on the other side may be so adapted to each other, that for example the locking device 2 is immovably mounted in the mounting device 1, or that the shaft 4 is immovably mounted in the locking device 2. In both cases, however, it is provided that the chuck key 3 can be freely rotated, either within locking device 2, or via locking device 2 moving with respect to mounting device 1.

The unit achieved by snapping the locking device 2 onto the shaft 4 of the chuck key 3 in the direction of the arrows 24, 25 and the mounting device 1, which later on is pushed in the direction of the arrows 26, 27 onto the locking device 2, is connected to a power supply line 13 for the machine in question by a string 14, which string or the like is mounted to the power supply line 13 with the aid of a holding device 19. For this reason the mounting device 1 is provided with a hole 17, through which hole the string 14 is pulled and locked with the aid of a socket 15. With its other end the string 14 is pulled through a hole 21 in the holding device 19 and locked with the aid of a socket 16. The holding device 19 carries a known clamp strap 18, which is put around the power supply line 13 and then through an opening 20 in the holding device 19 and is locked in position there with the aid of a serration 22 and not visible matching hooks at the holding device 19.

The clamp strap 18 may be mounted firmly or somewhat loosely on the power supply line 13. It must only be made sure that it cannot slide off the power supply line 13, by adapting the size of the loop formed by the clamp strap 18 in such a way, that the strap loop neither in the direction of the machine nor in the direction of the plug can slide off of line 13.

Instead of the string 14 a band or a chain may also be used.

Instead of the three part device comprising the mounting device, string and holder of FIGS. 1 and 2, with clamp strap a one-piece mounting device 31 as shown in FIG. 3 may also be used. From a preferably ring-shaped mounting piece of the mounting device 31 extends a projection 34, which on its part merges with a clamp strap 38. The latter comprises, starting at the projection 34, first of a wider part, in the middle of which there is provided a longitudinal slot 35 and the sides of which carry teeth 32. Gaps 37 are present between the teeth 32. At the end of the toothed surface of the clamp strap 38 it turns more slender and finally ends with an end part 33. This part 33 is in a known way, provided with lugs 42, 43, each defining with opposing sides of strap 38, a pair of notches 39, 40.

The clamp strap 38 wrapped around the power supply line 13 can in a known way be secured to the toothed part by its end piece 33, by hooking the lugs 42, 43 or the hooks 45, 46 into the gaps 37 between the teeth 32. Otherwise the mounting device 3 is in the same way as described above pushed onto the locking device 2, in which the shaft 4 of the chuck key 3 is inserted. When the mounting device 31 is pushed on, the edge 23 of the locking device 2 will overlap a flange surface 36 on the mounting device 31, such that a safe hold between the locking device 2 and the mounting device 31 is achieved. In this embodiment of the invention it is necessary that at least one of the locking device 2 and the mounting device 31 or the chuck key 3 and the locking device 2 are freely rotatable in relation to each other. An inner edge 41 of the ring-shaped part of the mounting device 31 should thus have a greater diameter than the bottom of the groove 8 of the locking device 2, or the diameter of the inner edge 9 of the locking device 2 should be bigger than the diameter of the shaft 4 of the chuck key 3, and in this way the chuck key is easily rotatable in the mounting device 31, which results in easy handling of the chuck key 3.

Just as described for the first embodiment of the invention also for the embodiment in FIGS. 3 and 4 the holder is mounted by first pushing on the locking device 2 in the direction of the arrows 24, 25 on to the shaft 4 of the key 3, and then pushing in the mounting device 31 in the direction of the arrows 47, 48 until the locking device 2 is snapped in.

In FIG. 5 is shown an alternative end 44 of the clamp strap 38 comprising hooks 45, 46 pointing inwards, which gives a safer hold for the end piece 44 in the gaps 37 between the teeth 32.

The invention, of course, is not restricted to the embodiments described above and shown in the drawings, but can be varied in several ways within the scope of the attached claims.

I claim:

1. A removable holder for connecting any conventional chuck key, having a circular cross-section shaft with a gearing on one end thereof having a diameter larger than the diameter of the shaft, to a machine with which the key is intended to be used, the holder comprising:

an inner locking device having a generally circular split ring configuration of more than 180° extent and less than 360° extent, the opening in the split ring being smaller than the diameter of the shaft of the chuck key with which it is designed to be used, wherein said inner locking device has an inner diameter which is smaller than the largest diameter of the gearing of the chuck key with which it is designed to be used, said inner locking device being composed of sufficiently resilient material to permit it to be snapped onto the shaft of the chuck key with which it is designed to be used;

an outer mounting ring with an inner diameter greater than the largest diameter of the gearing of the chuck key with which it is designed to be used, and having a predetermined axial thickness; and connecting means for connecting said outer mounting ring to the machine with which the chuck key is intended to be used, wherein said inner locking device has an axial length greater than the thickness of said outer mounting ring, and includes a stop flange at one end thereof, an insertion flange at the other end thereof and a groove formed between said stop flange and said insertion flange, wherein the radial distance from the center of said inner locking device to the outer end of said stop flange is greater than the inner radius of said outer mounting ring, thereby preventing said outer mounting ring from moving beyond said stop flange when in use, wherein said insertion flange is tapered toward the outer end thereof such that the outer diameter of the endmost portion of the taper is smaller than the inner diameter of said outer mounting ring and the largest outer diameter portion of said taper is greater than the inner diameter of said outer mounting ring portion, said insertion flange being sufficiently flexible to permit said outer mounting ring to be forced thereover; and wherein said groove has an inner surface with a diameter no larger than the inner diameter of said outer mounting ring.

2. A chuck key holder in accordance with claim 1, wherein the inner diameter of said inner locking device is larger than the diameter of the shaft of the chuck key with which it is designed to be used, thereby permitting a loose, relatively rotatable fit.

3. A chuck key holder in accordance with claim 2, wherein the inner diameter of said outer mounting ring is substantially the same as the diameter of the groove of said inner locking device, thereby providing a snug fit therewith.

4. A chuck key holder in accordance with claim 1, wherein the inner diameter of said inner locking device is no larger than the diameter of the shaft of the chuck key with which it is designed to be used, thereby permitting a snug, fit.

5. A chuck key holder in accordance with claim 4, wherein the inner diameter of said outer mounting ring is larger than the diameter of the groove of said inner locking device, thereby providing a loose, relatively rotatable fit.

6. A chuck key holder in accordance with claim 1, wherein the portion of said inner locking device having the smallest inside diameter is disposed at the stop flange end thereof, the remainder of the inner surface of said inner locking device having a diameter larger than said portion of smallest inside diameter, whereby the insertion flange end of said inner locking member is in effect cantilever mounted on said stop flange end thereof.

7. A chuck key holder in accordance with claim 1, wherein said connecting means comprises attaching means attachable to the machine and flexible means interconnecting said outer mounting ring and said attaching means.

8. A chuck key holder in accordance with claim 7, wherein said flexible means is a string, band, chain or strap.

9. A chuck key holder in accordance with claim 7, wherein said flexible means is formed integrally with said outer ring portion and said attaching means.

* * * * *